April 22, 1952 C. K. BROWN, JR 2,593,409
STRAIGHT LINE BLOCK MOLDING MACHINE
Filed Dec. 31, 1948 8 Sheets-Sheet 1

INVENTOR.
CHARLES KEPLER BROWN JR.
BY Howard J. Whelan.
ATTORNEY

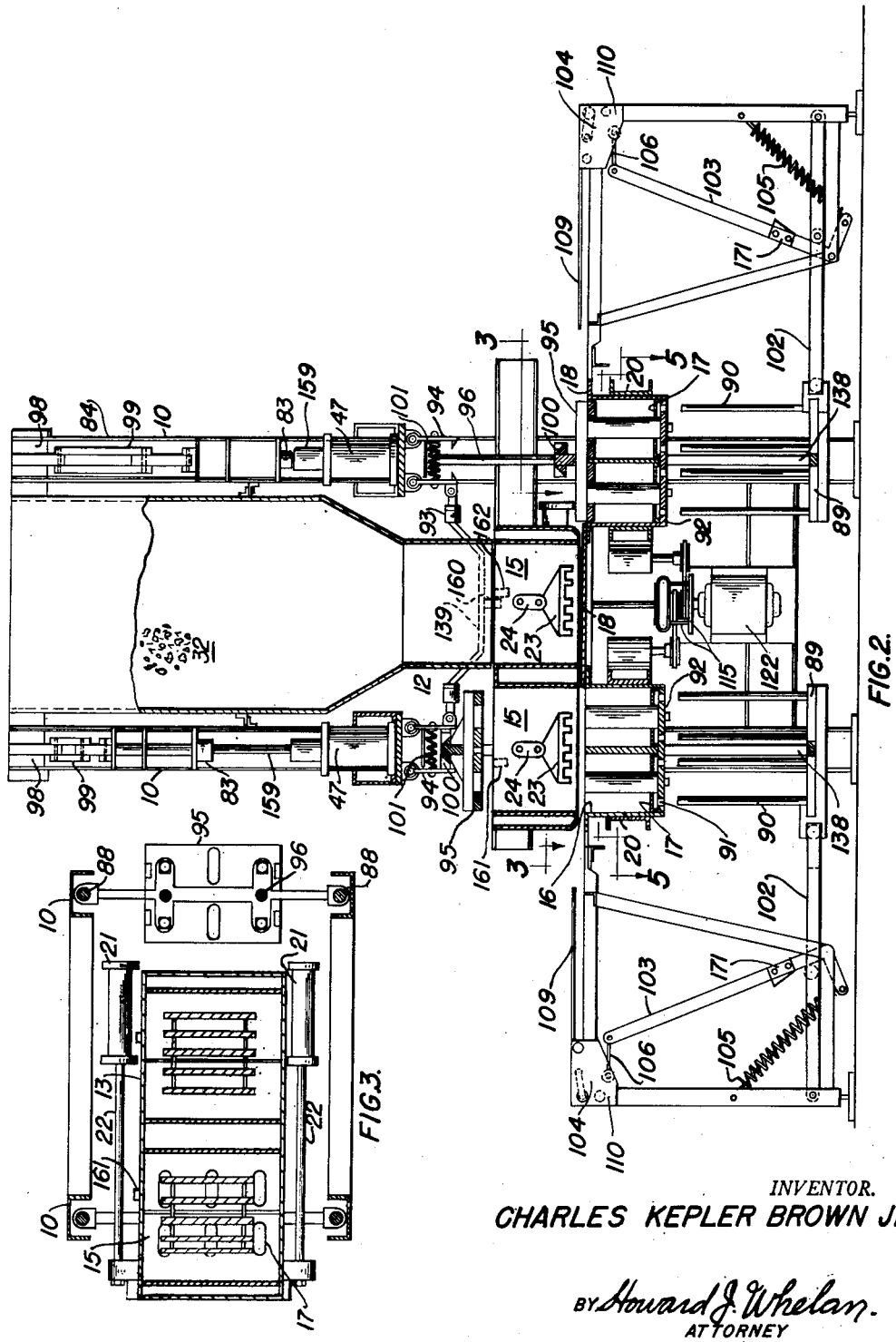

April 22, 1952 C. K. BROWN, JR 2,593,409
STRAIGHT LINE BLOCK MOLDING MACHINE
Filed Dec. 31, 1948 8 Sheets-Sheet 3

INVENTOR.
CHARLES KEPLER BROWN JR.

BY Howard J. Whelan.
ATTORNEY

April 22, 1952 C. K. BROWN, JR 2,593,409
STRAIGHT LINE BLOCK MOLDING MACHINE
Filed Dec. 31, 1948 8 Sheets-Sheet 4

INVENTOR.
CHARLES KEPLER BROWN JR.

BY Howard J. Whelan.
ATTORNEY

April 22, 1952     C. K. BROWN, JR     2,593,409
STRAIGHT LINE BLOCK MOLDING MACHINE
Filed Dec. 31, 1948     8 Sheets-Sheet 5
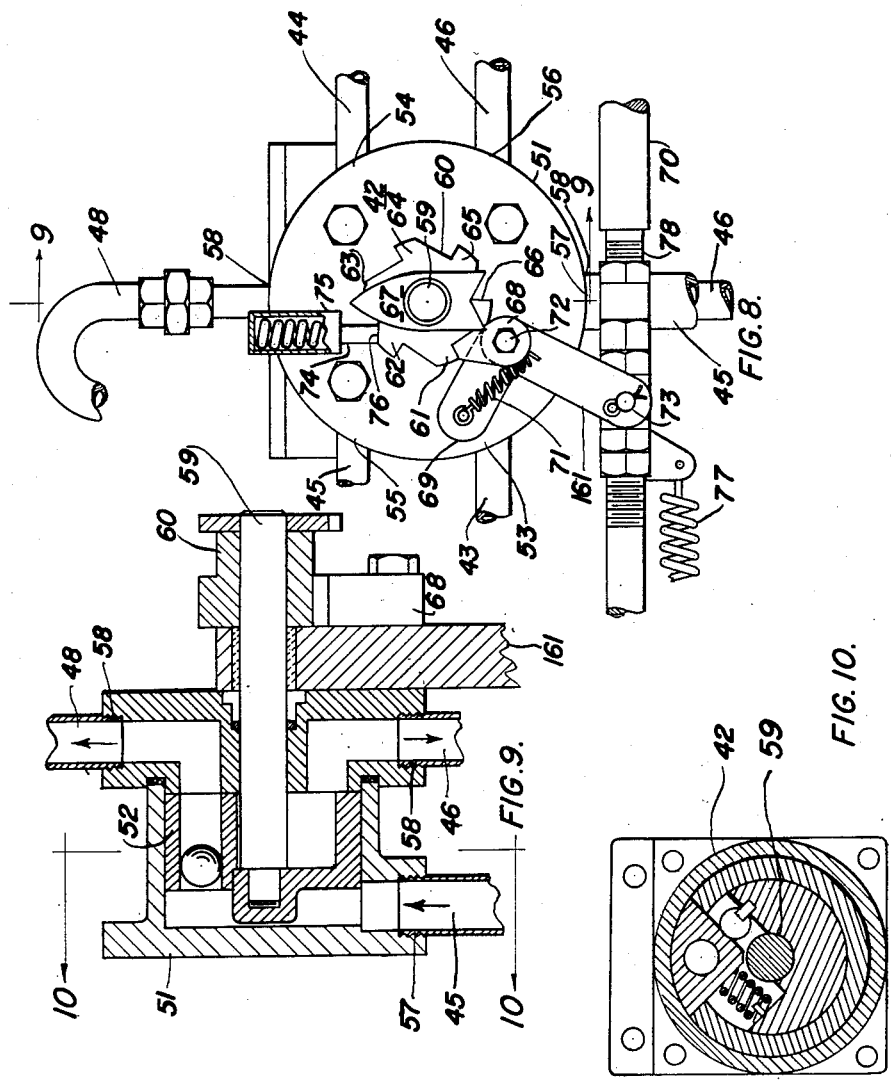
INVENTOR.
CHARLES KEPLER BROWN JR.
BY Howard J. Whelan,
ATTORNEY April 22, 1952 C. K. BROWN, JR 2,593,409
STRAIGHT LINE BLOCK MOLDING MACHINE
Filed Dec. 31, 1948 8 Sheets-Sheet 6
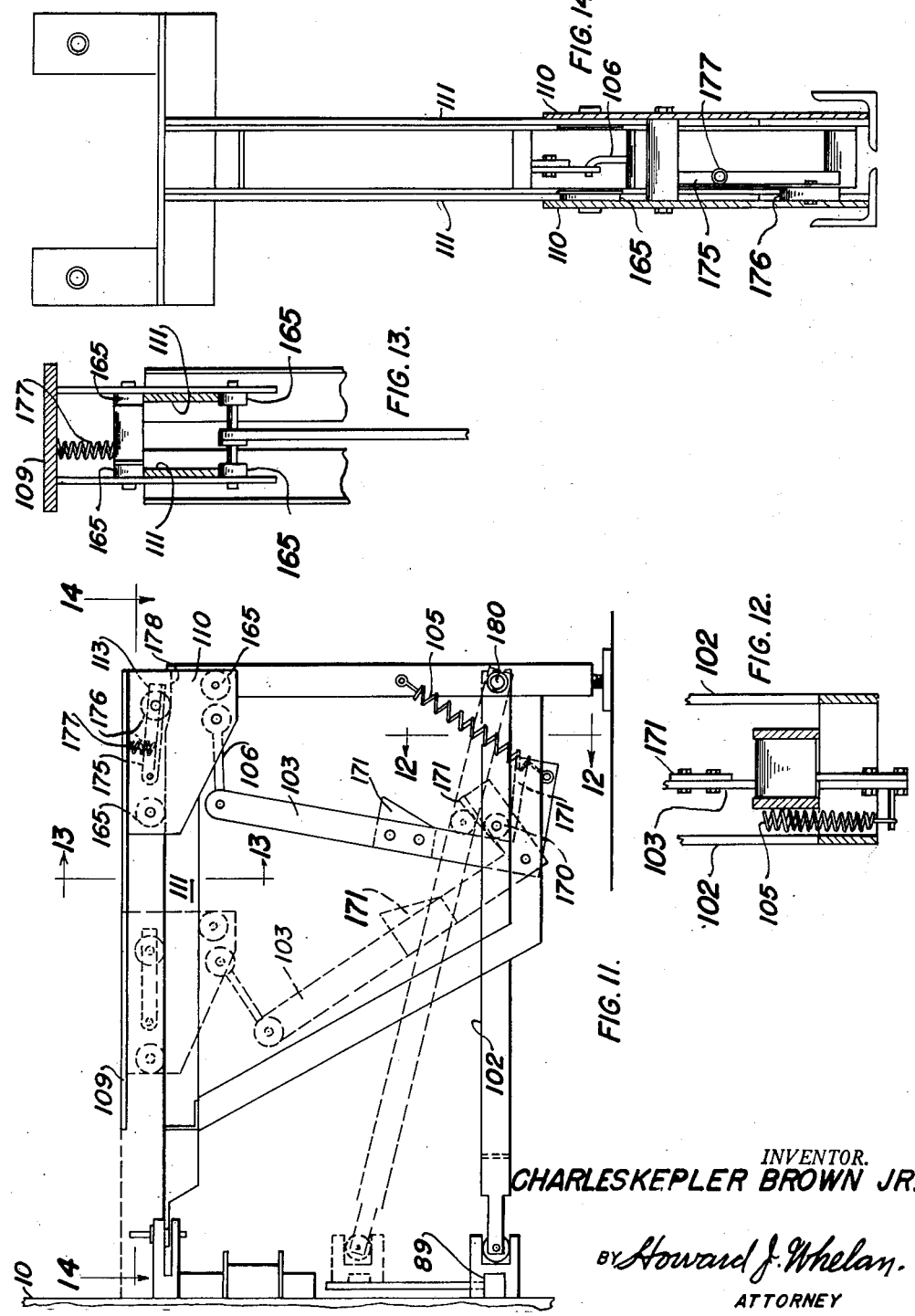
INVENTOR.
CHARLES KEPLER BROWN JR.
BY Howard J. Whelan.
ATTORNEY April 22, 1952     C. K. BROWN, JR     2,593,409
STRAIGHT LINE BLOCK MOLDING MACHINE
Filed Dec. 31, 1948     8 Sheets-Sheet 7
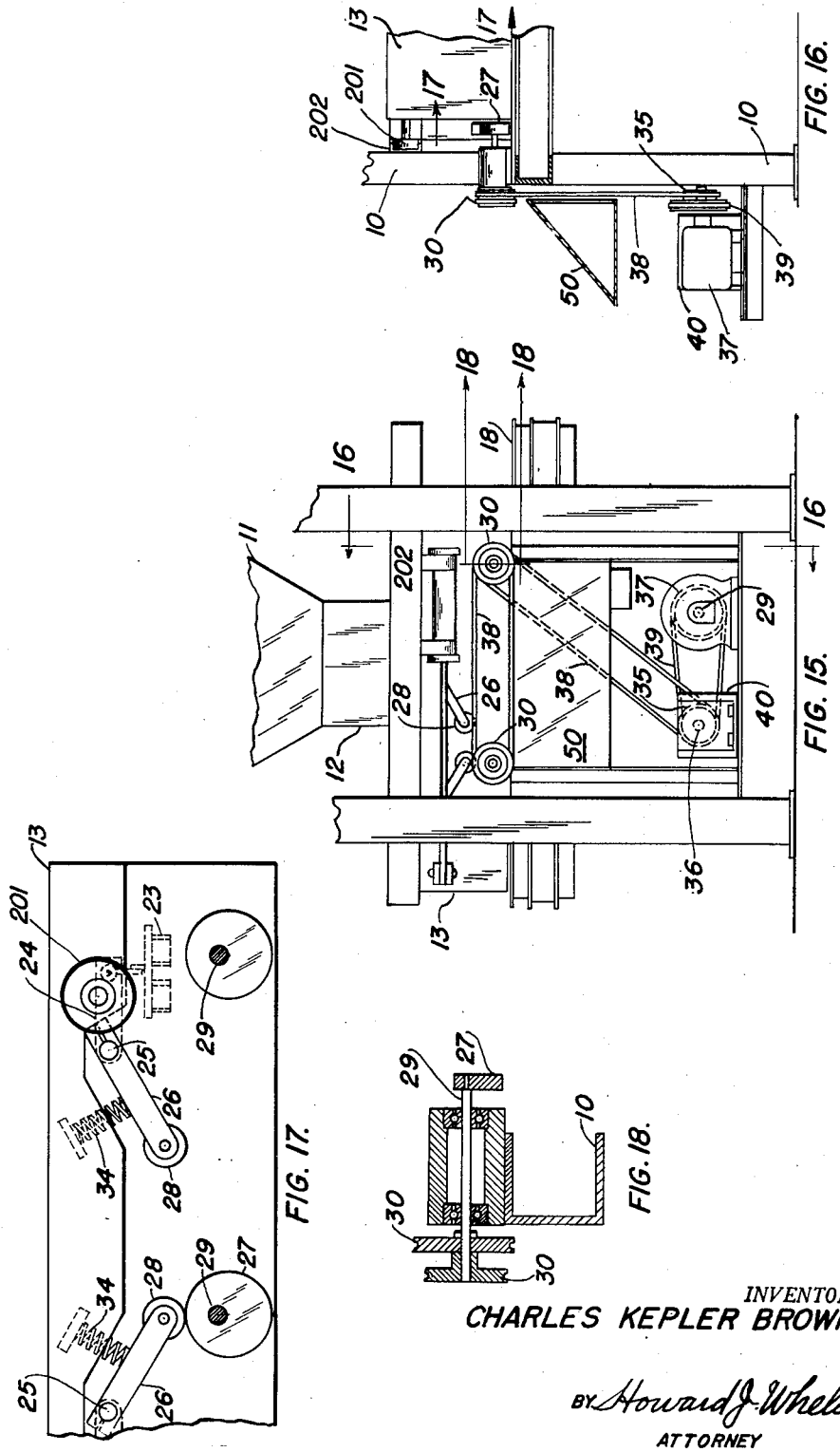
INVENTOR.
CHARLES KEPLER BROWN JR.
BY Howard J. Whelan.
ATTORNEY April 22, 1952     C. K. BROWN, JR     2,593,409
STRAIGHT LINE BLOCK MOLDING MACHINE
Filed Dec. 31, 1948     8 Sheets—Sheet 8

INVENTOR.
CHARLES KEPLER BROWN J.R.
BY Howard J. Whelan.
ATTORNEY

Patented Apr. 22, 1952

2,593,409

UNITED STATES PATENT OFFICE 2,593,409

STRAIGHT LINE BLOCK MOLDING MACHINE

Charles Kepler Brown, Jr., Fairmont, W. Va., assignor to Bergen Machine & Tool Company, Inc., a corporation of New Jersey Application December 31, 1948, Serial No. 68,603

5 Claims. (Cl. 25—41)

This invention relates to the manufacturing of building materials and especially to equipment for molding blocks and bricks of cemented materials, or aggregates.

There are at the present time, a number of concrete block machines made and used commercially for heavy or large scale production. Such machines require considerable attention and are limited in their capacity to the molding of one block at a time. In doing this work, the noise during production is excessive and places the employees under heavy physical or nervous stresses that affect their health and comfort. The production is intermittent since the cycle of events have to be begun and continued through completely every time a block is molded before another is started. Further the mechanisms usually employed include gears, sprockets and chains that are subject to considerable wear and tear, as well as repairs, because they are readily covered by the spilled materials used for making the blocks that damage them. This involves a large proportion of shut-downs and expensive replacements. In this invention, the machine is capable of continuously molding blocks in plural quantities at a rapid rate, without waste of time. While one set of blocks is being removed after molding, another set is being molded in the machine. Instead of requiring an entire cycle for the molding of a single set of blocks, two or more sets are made at the same time, sequentially to one another in the same period. The use of mechanisms that are simple in structure, cheap to manufacture, and commonly available, is an important item in the construction of this invention, and enables worn-out units to be readily replaced at low cost and inappreciable interruption. The machine is adjustable in many of its parts to permit a considerable degree of accuracy to be obtained in the contours of the blocks, as well as flexibility in the use of materials in the aggregate. It is an object of this invention to provide a new and improved building block or brick machine that will avoid one or more of the disadvantages and limitations of the previous types of machines used for this purpose.

Another object of the present invention is to provide a new and improved block or brick machine that will mold blocks or the like, continuously from aggregates.

A further object of the invention is to provide a new improved block machine that will be effective in its work, relatively economical to manufacture, inexpensive to maintain, and having exceptional and continuous molding capacity.

An additional object of the herein invention, is to provide a new and improved block machine that will have unusual facilities for adjusting the machine in its operation, in its use of aggregates, and to the design and the ultimate form of the article molded therein.

A still further object is to provide a machine that will allow its molds to be easily and quickly removed.

A still further object is to avoid the use of pressure mechanism to compact the aggregate together, while vibration continues after excess aggregate has been scraped off of mold box.

Other features and objects of the invention will be evident as it is more fully described.

For a better understanding of the invention, its principles and objects, reference is made to the appended drawings, which illustrate a particular form of the invention, by way of example, not of limitation. These drawings in conjunction with this specification outline a construction that is preferred at the moment, and is used for the molding of concrete blocks of conventional form, but could be conveniently and simply modified by changing the mold unit of the device to make bricks, and other articles of value in which the aggregate could be molded into and desirably employed. Therefore in referring to blocks in the specifications, it is intended to include such bricks and articles broadly. The adjustments provided in the machine enable it to adapt its operation to suit the different requirements of the materials used and the form of the product. The claims emphasize the scope of the invention.

Referring to the drawings:

Figure 2 is a side elevation and section taken on line 2—2 of Figure 1;

Figure 3 is a sectional view taken on line 3—3 of Figure 2 and primarily indicates the construction of the aggregate feed drawer;

Figure 8 is an enlarged detail of the hydraulic valve control used in this embodiment;

Figure 9 is a sectional elevation taken through the valve control on line 9—9 of Figure 8;

Figure 10 is a sectional elevation taken on line 10—10 of Figure 9;

Figure 11 is a detail of the block shifter mechanism, used in this embodiment;

Figure 12 is a sectional view taken on line 12—12 of Figure 11;

Figure 13 is a sectional view taken on line 13—13 of Figure 11;

Figure 14 is a sectional plan view taken on line 14—14 of Figure 11;

Figure 15 is a detail of the agitator mechanism used in this machine;

Figure 16 is a sectional detail in elevation taken on line 16—16 of Figure 15;

Figure 17 is a sectional view through agitator assembled drawer and taken along line 17—17 of Figure 16;

Figure 18 is a sectional view through the cam mechanism for operating the agitators taken along line 18—18 of Figure 15;

Similar reference numerals pertain to the same parts throughout the drawings.

Figure 1:
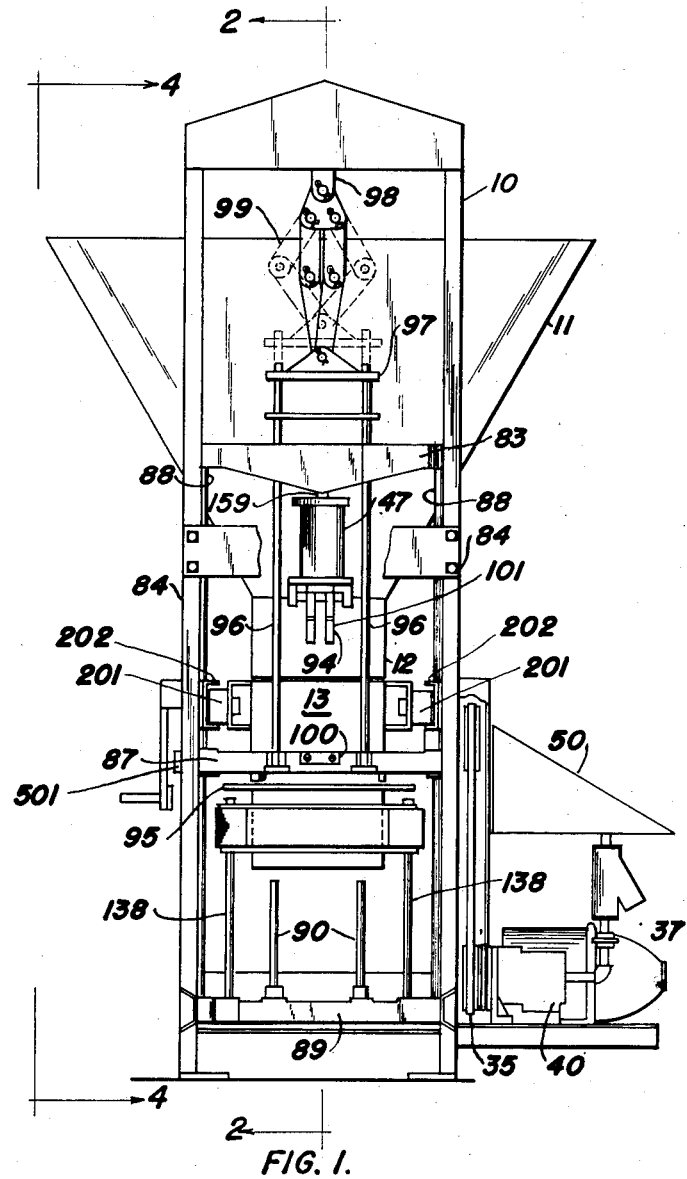
Figure 1 is an end elevation of a block machine embodying this invention, viewing it from an operators area of stand, with the leveling head plate in lowered position.
Figure 4:
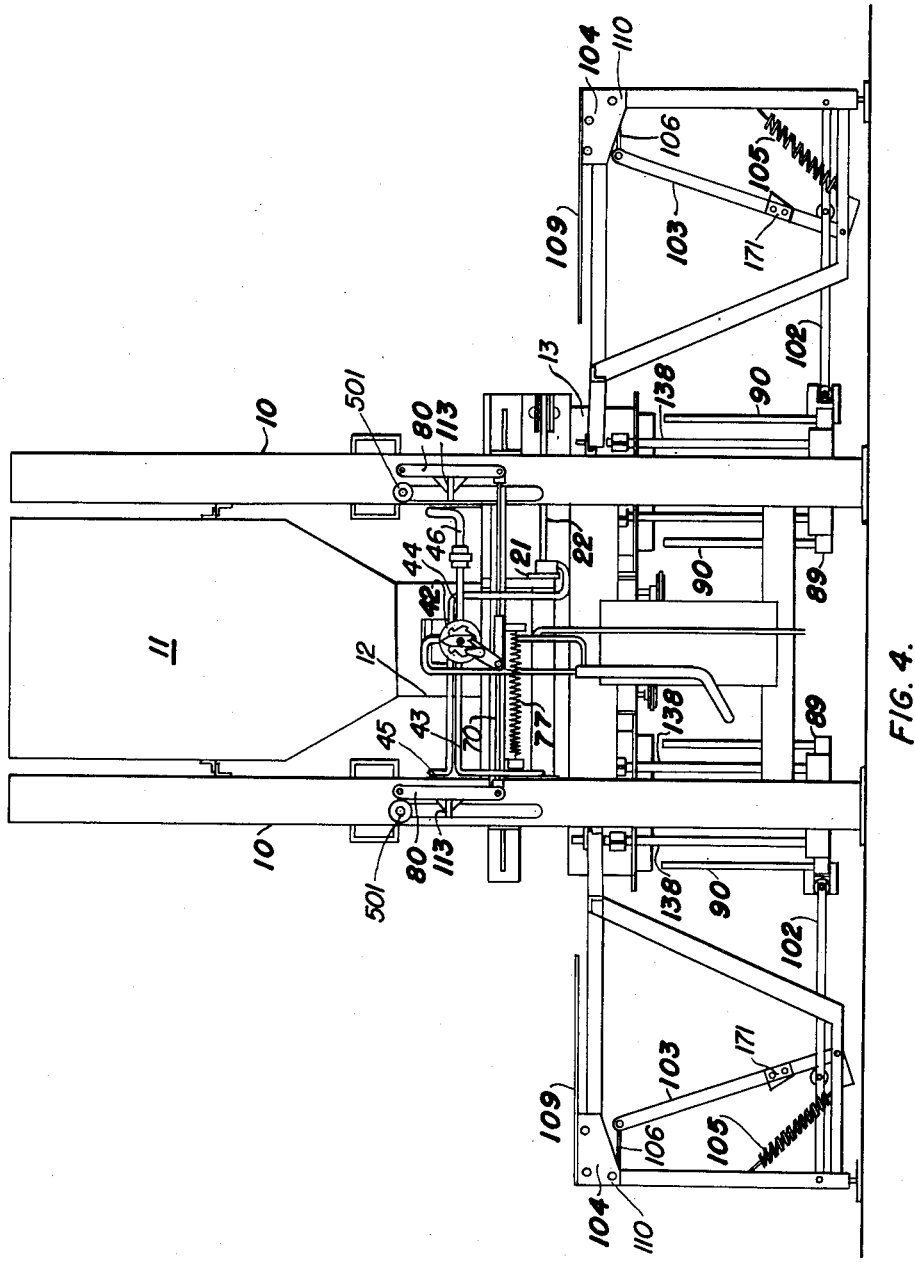
Figure 4 is a side elevation of the machine at the valve control side.

In the particular construction illustrated in the drawings, a block machine for manufacturing cement blocks is indicated. This machine consists of a framework 10 of structural type substantially made to carry the loads on its parts, the vibrations and stresses incurred in its use and the weight of materials used in production. In the upper portion of the frame 10, a hopper or bin 11 is carried to hold the aggregate 32 to be used for the blocks and supplying it as needed to the molds of the machine. This hopper has slanting sides that terminate in a rectangular throat 12 to facilitate the flow of materials. This throat is interiorly formed for easy and continuous delivery of aggregate through it, and is sized to fit over the open reciprocating receptor or drawer 13. This receptor or drawer is of the capacity needed for the blocks to be made at a time. In this instance it is double ended and of sufficient capacity for the filling and making of two sets of blocks at a time. Partitions 14 serve to separate the receptor or drawer 13 into two compartments 15 for this purpose. This receptor or drawer or feed transfer hopper 13, has its top surface closely aligned with the bottom surface of the throat 12, so it can be readily slid and reciprocated under it, whether filled or unfilled. The partitions 14 space the compartments 15 in the receptor or drawer 13 sufficiently to allow one compartment to be under the throat 12 at the middle while the other is aligned over the mold hole 16 below which the mold 17 is situated, at one side of the framework. In other words while one compartment 15 is being filled at the centrally located throat 12 of the hopper 11, the other compartment 15 is laterally located over the selected mold hole 16 dumping the aggregate through it into the left hand mold 17. By reciprocating the receptor 13 or drawer in the opposite direction, the process is reversed, that is, the throat 12 fills the compartment 15 that was previously dumping, while the other compartment 15 is being emptied into right hand mold 17. The receptor or drawer 13 slides over a platform 18 mounted horizontally on the frame, which is closed over, under the throat 12 and open at 19 above the molds 17. The feed drawer 13 is supported by and runs on rollers 201 positioned in channels 202. This permits the receptor or drawer 13, which is open at the bottom, to slide along the platform and discharge its contents into the molds 17, when aligned with them individually. Cylinders 21 at each side of the receptor or drawer 13 are so connected to its sides and the framework, that the operation of the piston rods 22, can alternately reciprocate the receptor or drawer 13 to the two dumping and filling positions located on the platform 18. The material in the molds 17 is packed and molded into an adhesive shape or block under a high speed vibrating action. The vibrators are the more essential mechanism of the vibrator system.

Figure 5:
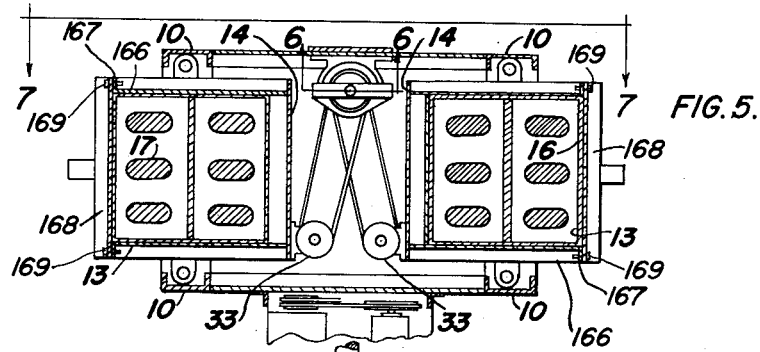
Figure 5 is a sectional plan taken on line 5—5 of Figure 2 indicating the general construction of mechanism of the feed drawer.
Figure 6:
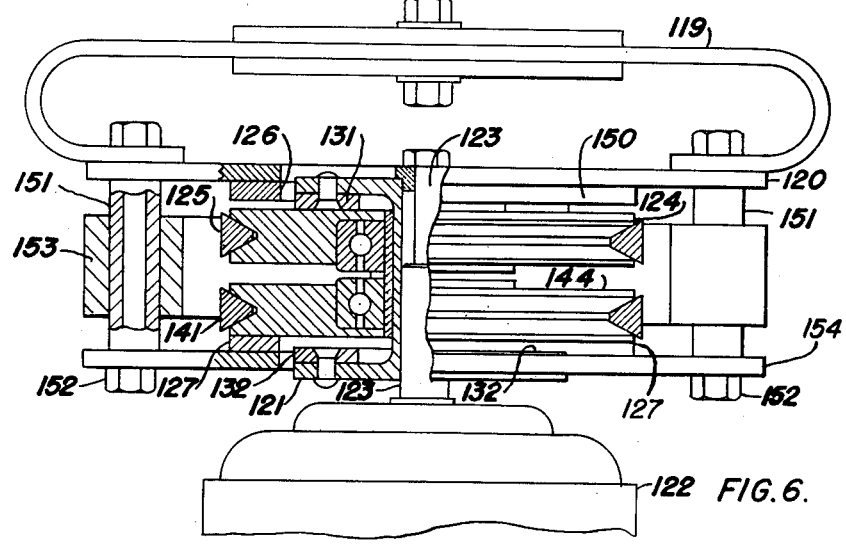
Figure 6 is a partial section view in elevation through the clutch used with this embodiment.
Figure 7:
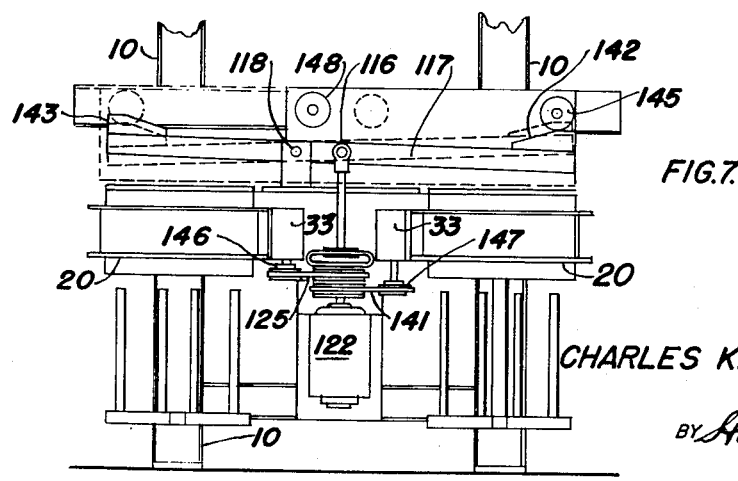
Figure 7 is a detail of a portion of the machine in elevation indicating the clutch shifting mechanism taken on line 7—7 of Figure 5.
Figure 19:
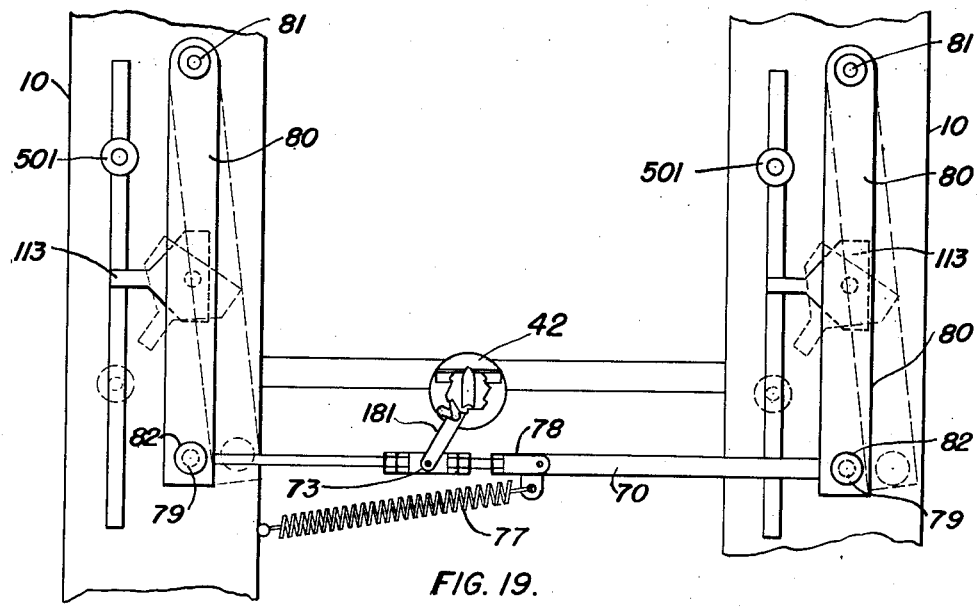
Figure 19 is a side elevation showing the valve operating mechanism connected with the control valve.
Figure 20:
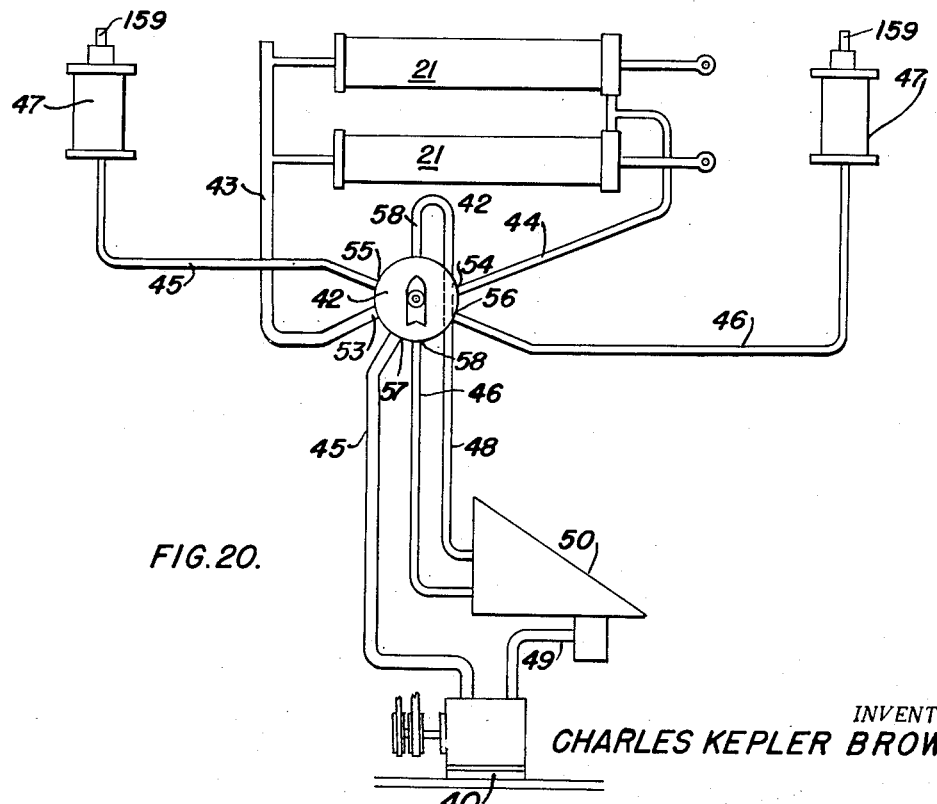
Figure 20 is a diagrammatic view of the hydraulic system used in this invention.

The operation of the vibrators of the vibrator system is dependent on the alternate positioning of the clutch 115. This clutch 115 is indicated in Figures 5, 6 and 7, and is attached to an eyebolt 116 attached to an oscillator bar 117 pivoted at 118 on the frame 10 of the machine. The eyebolt 116 is adjustably bolted to a flat spring 119 curved downwardly at the ends and arranged for attachment to the housing plates 120 and 154 which support brake bands 126 and 127 respectively. The housing plates are attached to the spring 119 by spacers 151 and bolts 152. The housing plates 120 and 154 are supported by a C bracket which is attached to the framework 10. The motor 122 is supported on the framework 10, and the motor shaft 123 supports a spool 121 which rotates with it. Pulleys 124 and 144 are loosely mounted on the spool 121 and are driven by it at predetermined intervals and in a manner to be explained later. The discs 150 are provided with brake bands 126 and 127 to contact the sides of the pulleys 124 and 144 and alternately stop them against rotation. The inside of the shoulders of the spool 121 are provided with drive bands 131 and 132 to contact and drive first one pulley 124 and then the pulley 144, depending on whether the action of the oscillator bar 117 through the eye-bolt 116 raises or lowers the housing 120 and causes its drive brake bands 131 and 132 to drive its respective pulley while the other pulley is held against rotation by its respective brake band. The pulleys 124 and 144 are provided with belts 125 and 141 that operate pulleys 146 and 147 attached to vibrators 33 independently of each other. The vibrators 33 consist of rotating off-center weights, the rotation of which at high speed produces a rotary reaction which transmits a vibration to the vibrator frame 20 and mold 17 and packs the material in the molds. When the drawer 13 is moved in the right hand direction as shown in Figure 7 its roller 145 contacts the cam face 142 on the oscillator bar 117 causing the eye-bolt 116 to be lowered and press the pulley 144 against the drive band 132 and be rotated thereby to drive the belt 141 and pulley 147 and cause the vibrator 33 to shake down and pack the right hand compartment shown in Figure 7. When the drawer is shifted to the left, the roller 148 contacts the cam face 143 and depresses it sufficiently to raise the eye-bolt 116 and presses the brake band 127 against the pulley 144 and stops its rotation, and forces the pulley 124 against the drive band 131 to rotate the pulley 124 and through its belt 125 drives the pulley 146 and causes the vibrator 33 to shake down and pack the left hand compartment, also shown in Figure 7. The vibrator frame 20 is mounted on four vertical spring steel rods 138 that allow horizontal vibration only and holds the vibrator frame 20 and molds 17 perfectly level for finishing the blocks under pressure as well as for removing the blocks out of the mold. The vibrator frame 20 is formed by a channel member 166 bent into a U form to which are welded plates 167 that act as supports for a channel member 168 which can be removed so the mold 17 can be removed from the front or top of the vibrator frame.

In order to break up the aggregate as it fills the molds 17 from the compartment 15, agitating means are used. This means consists of an agitator grid 23. This grid is suspended in the middle portion of the compartment 15 from a link 24 on a shaft 25 journalled on the side wall of the receptor or drawer 13. The shaft extends from the interior to the outside of the receptor or drawer, where a rocker arm 26 is rigidly attached to it. This rocker arm 26 is so placed that the receptor or drawer in its travel and stoppage at the mold 17 will be operated by the contact of a cam wheel 27 against it while discharging the aggregate into one of the molds 17. A roller 28 on the arm 26 takes up the contact directly and resiliently and facilitates the action of the cam. The cam 27 is mounted on a shaft 29, journalled on the frame 10, that is rotated through the use of a pulley 30 attached thereto. As the cam wheel 27 intermittently strikes the roller 28, it causes the agitator grid 23, to bounce up and down. This stirs up and feeds the aggregate 32 and eliminates any lumps that might have existed in it during its travel in to the mold 17. The upper portion of the receptor or drawer 13 has a plate 31 over the partitions 14 that closes the space in between against the entrance or aggregate therein. The plate 31 is slightly overextended to afford a sharp cut-off to the receptor or drawer 13 as it passes under the throat 12. This also partially diverts the aggregate 32 so it will not slide down on the front and back walls of the receptor or drawer 13 and tend to stick there. The size of the compartments 15 is determined by the amount of aggregate in excess to that required to fill the block molds 17 accurately.

The agitator grid 23 is operated in one compartment only at a time, and that is the specific compartment discharging the aggregate. The agitator grid 23 in the other compartment 15 is stopped. Also a vibrator 33 beats continuously against the corner of the mold box 20 as the receptor registers its opening 19 over the proper mold 17. This vibrator 33 is mounted at a corner and shakes the sides or walls of the mold box at this location and makes it settle all aggregate that may be in the mold 17, so it will fill it completely and solidly. The rocker arm 26 in each instance is biased in an angular portion on the receptor by a coil spring 34 which is resilient to pressure. When the receptor or drawer 13 is moved over so that one compartment 15 is aligned with the throat 12 at the middle, it will bring its roller 28 adjacent the other compartment 15 in the line of action of the wheel cam 27 at the side of the machine. Since the pulleys 30 are operated from a power pulley 35 on its shaft 36 from a motor 37, they actuate the agitator grid rapidly, through the striking actions between the cam 27 and roller 28, when the receptor or drawer 13 aligns them with each other. The pulleys 30 and 35 are connected with each other by belts 38, as indicated in Figure 15, so they operate together.

The motor 37 is fastened to the lower portion of the frame and mounted with its shaft 29 in a horizontal plane. The shaft 29 also operates a hydraulic pump 40 by a belt 39 and pulley 35, because its speed of rotation may be different from that required for the agitators. The pump 40 supplies the necessary volume and pressure of oil used to work the hydraulic system of the machine. The oil circulates in the system under the guidance of a rotary port control valve 42, fed by piping 45 from the pump 40, and flowing out through the piping 43 and 44 alternately to the receptor or drawer shift cylinder 21 and then later through pipes 45 and 46 to the lift cylinders 47. The piping 46 and 48 from the same valve are reliefs leading back the triangular shaped hydraulic tank 50 which holds the supply of oil necessary to feed the system. The pump 40 takes its supply of oil from the tank 50 through the piping 49, and circulates it as required and as the rotary port control valve 42 permits. The pistons in the cylinders 21 are returned to normal positions by reversing the pressure through the valve 42. The cylinders 47 return to starting point when valve 42 is moved to neutral and allows oil to drain back to tank 50.

The control valve consists of a stationary outer shell 51 arranged with various ports connecting through the central rotating body 52 having passages therethrough for guiding the hydraulic fluid coming from the pump 40 to the various cylinders, 21, and 47. The ports are termed respectively, the right hand shift 53; the left hand shift 54, the left hand lift 55, the right hand lift 56. The passages in the body 52 are termed input pressure 57 and neutral outputs 58. The body 52 is rotatable with a shaft 59 in the shell 51, which is stationary and rigidly secured to the frame 10 at platform level. The shaft 59 extends outwardly into a ratchet wheel 60, having six teeth 61, 62, 63, 64, 65 and 66, as well as through an indicator member 67 of arrow form which points to the pipe used. The teeth are engaged sequentially by a pawl 68 lifted by arm 161 on which it is mounted, so as to propel the ratchet wheel 60 clockwise one tooth distance at a time, and then slide back resiliently to its normal catching position, the action being facilitated by a spring 71. The bell crank 69 is part of an arm 161 and oscillates on shaft 59. The arm 161 is also pinned to a reciprocating control bar 70 at 73 mounted exteriorly on the frame 10. The movement of the ratchet wheel 60 is controlled in single step advancements by the plunger 74 working in a cylinder 75 and resiliently pressed against the angular flat side 76 of the ratchet 60. The cylinder 75 is rigidly attached to the shell 51 of the valve. When the valve control bar 70 is pulled to the right, the pawl 68 skips over the teeth of the ratchet 60 and does not move the valve 42. When the bar 70 returns to its original position at the left hand under the tension of a coil spring 77 attached to it and the frame 10, the pawl 68 moves the valve 42 one step forward. The bar 70 is made adjustable in length by means of a coupling joint 78 of suitable form. The horizontal bar 70 is loosely suspended at the side of the frame at each end on loose pins 79 to the lower ends of vertical links 80. The links 80 are oscillatably attached at their upper ends to the frame 10 on pins 81. Handles 82 extend out at right angles to the links 80 so as to be accessible to the users of the machine at both sides. They are placed low down in the links 80, at a level convenient for handling. Also mounted on the frame 10 adjacent to the links 80 are the automatic valve operating mechanisms 113. The automatic valve operating mechanisms are employed to operate the valve into the lift position when roller 501 drops down, and then into neutral again as the pressure head to which roller 501 is attached is raised up to its cocked or holding position. The handle 79 is then operated to start the drawer 13 moving to the other end of the machine and as it reaches the other end one of the dogs 161 or 162 on feed drawer operates a catch holding up the pressure head over the mold just filled, this allows pressure head to fall on the top of the filled mold and roller 501 to which it is attached then operates the valve into lift position for same end and as the cylinder reaches the top of its stroke, roller 501 again operates and indexes the valve into the opposite neutral position.

The lift cylinders 47 have a very important function in the operation of the machine. They individually operate on their own side of the machine, separately, and through their pistons and piston rods 159, cause each lifting bracket to reciprocate in a vertical plane. The bracket comprises a large cross-arm 83 extending between the vertical channel columns 84 of the frame 10 and running between them in its travel. When the valve 42 opens the port leading to the said cylinder 47 the hydraulic pressure is on. It then raises the left hand piston rod 159 with the bracket cross-arm 83 so it travels vertically upwards in the framework 10. The latter by means of channels 84 guides it straight. This cross-arm 83 has bolt-like rods 88 extending vertically below it, and they in turn are secured at the bottom of the frame 10 to a movable cross-plate 89, transversely located under the mold box 29. Posts 90 projecting upwardly from the cross plate 89 are long enough to pass through passages 91 in the mold-box when raised and in doing so contact the pallets 92 which are placed therein for the blocks to be molded thereon. These posts 90 are lifted when the cross-arm 83 is propelled upwardly by the cylinder 47 and rods 88. However as the receptor 13 is moved out of alignment with one of the molds 17 and before the posts pass into the mold box, to raise the mold, a trip mechanism 93 attached to hook links 94, operates and releases a heavy flat head plate 95 and incidental mechanism so it falls directly down on the top surface of the aggregate with considerable force, and packs the aggregate solidly in the mold box as well as smoothing over the top of the block sharply. After this is accomplished, the posts 90 are started and slowly continue upwardly to engage the pallets 92 and raise them up with the molded aggregate on them, through and above the mold-box. The pallets 92 do not move until the head plate 95 has moved about 2 inches up and off the mold box. The headplate 95 is guided by a bracket 87 as it slides on rods 88 and by its vertical columns 96 as they pass through the cross arm 83 in the frame, as its cross head 97 is raised by the cross-arm 83 acted upon by the piston rods 159. The crosshead 97 is suspended from a clevis 98 at the top of the frame 10, by duplex toggle links 99. When these toggle links 99 are down they assume a position almost straight but not quite. This is done to prevent their being on dead center in that position, and hard to operate at the start of the raising position. When in raised position, the links 99 extend out in V-form laterally. This leaves the clevis 98 in the same location and avoids raising it, when the cross head 97 moves upwards. The headplate 95 and its entire mechanism is held in its uppermost position when raised to it, by the engagement of the hook links 94 under the lugs 100 projecting from the headplate 95 as indicated. The lugs 100 are wedge-like so as to press out the hook links 94 against the resiliency of a spring 101 acting on them, when the lugs are raised, and at the proper point spring back and catch them. These hook links 94 are tripped at the proper time by the movable bar 139 to let the headplate 95 fall, again. This movable bar 139 ties the inside hook links 94 for each headplate together so only one plate can drop at one time. The movable bar 139 has a projection 160 which contacts lugs 161 or 162 positioned on the wall of feed drawer 13 and moves the bar 139 by the movement of the receptor 13 in either direction, and the headplate is dropped.

When the blocks on the pallets 92 are raised above platform level, the cross plate 89 brings a projecting element 102, that extends over and trips a member 103. This releases the table mechanism 104 and allows the heavy coil spring 105 to pull on the bars 106, and move the block receiving shelf 109 in under the pallets. The shelf 109 consists of a flat plate with one end attached to the carriage 110 with supporting wheels 165 riding on rails 111 on the structure. The shelf 109 is so arranged that one of its ends is free and extending over, as shown. The movement of the shelf is quick and powerful. The posts 90 that raise the pallets 92 are arranged so they will not interfere with the placing of the shelf underneath the pallets. Also the pallets are held above the mold box so they will not move injuriously as this action is taking place, as the shelf slides below the pallet without touching it in its placement. After the shelf is located under the blocks just molded, the hydraulic valve 42 is moved an additional notch into neutral position, starting the cylinder 47 in reverse or lowering position. As the cross plates 89 is lowered by this action, the pallets 92 are rested with the blocks on them, on the shelf 109. Then continuing further, the projecting element 102 is operated so its wheel 170 will bear on the wedge 171 to force the member 103 and bar 106 to move the carriage back to its starting point against the tension of the spring 105 and bring the table outwardly from the frame 10 with the blocks accessible for removal. When the shelf is brought back to the starting position it is caught by the catch 113 and held there. While this is going on, the aggregate is being fed in the second mold at the right of the machine, with the agitator bouncing up and down in the receptor, and the vibrator shaking the vibrator frame and mold 17, followed by the procedure already previously given in the left hand mechanisms. The catch 113 comprises a bar 175 which is attached to the carriage 110 at one end and is attached to a roller 176 and tensioned by a spring 177. The rails 111 are cut back at 178 to hold the wheel 176 binding at 178 through the action of spring 177. The operation of the machine is characterized by two classes of functions, one being that due to the hydraulic or propelling system, while the second is the mechanical or material conditioning system. Both are important to the results to be attained.

The hydraulic system causes the receptor or drawer 13 to move into its different positions on the platform such as that of receiving the aggregate, moving it to the mold, and then discharging it into the latter. This is accomplished in the particular structure indicated in the drawings, by the cylinders and their piston rod attachments. Two cylinders 21 are used, one being attached to and acting on each side of the receptor or drawer 13 so the latter will receive a balanced push to make it travel straight. To make the cylinders 21 operate, the user, moves the control bar 70 so that the ratchet 60 will move it forward one notch and open the valve 42 between the pump piping 45 and the feed piping 43 to the cylinders 21. Both cylinders 21 work in unison and push the receptor 13 over to the left side of the machine, and firmly keep it there. This allows the receptor 13 to discharge its load of aggregate out of its left compartment 15 through the opening 19 into the mold 17 below. While this is being done, the agitator grid 23 in it is rapidly hopping up and down in among the aggregate and promotes its discharge.

Also the vibrator 33 on the corner of the vibrator frame 20 is rapidly vibrating the latter on its rods 138 and causing the aggregate to settle quickly and effectively in the mold 17, on the pallet underneath the aggregate, in the bottom of the mold. When this has proceeded long enough, which is varied to suit, the user pushes the control bar 70 so it will advance the valve another notch and connect the piping so the hydraulic pressure will act to shift the drawer back to the center where it is refilled. As the drawer is shifted it releases the links 94 and drops the plate 95 to compress the aggregate in the mold; the control bar 70 moves the valve another notch so the hydraulic pressure will act on the lift cylinder 47. When this occurs, the cylinder 47 moves its piston and cross arm 83 upwardly and contacts the cross arm 97 and raises the head plate 95 through its rods 96 until the lugs 100 are caught by catches 94, and remain in this position until released in the next cycle. When the plate is at its top position it will be two inches above the top of the finished block. The headplate 95 when released falls with considerable force on the aggregate in the mold 17 and packs it, as well as finishes off the top surface of the block with a sharp contour, leaving room for the molded blocks just made to be raised to the level of the platform 18 on their pallets 92 without touching the plates. Just after this has been done, the mechanism of the cross plate 89 moves the projecting element 102 and tilts it on its fulcrum pin 180. The element 102 moves the other member 103 and bar 106 so that they carry the carriage 110 towards the machine and place the shelf 109 under their pallets 92, against the tension of the spring 105. As the pressure head plate 95 is raised until its cocked or holding position is reached, projecting roller 501 operates valve indexing mechanism attachment 113, operating arm 80 and link 70 simultaneously to index valve 42 to neutral, allowing the oil to drain out of cylinder 47 and lift mechanisms 89 and 90 to return to normal. As 89 and 90 return to normal pallets 92 containing molded blocks are deposited on shelf 109 which has darted in under the block the instant they cleared the mold. The continuing settling of frame 89 operates projecting arm 102 which in turn operates arm 103 returning carriage and shelf assembly to its normal position with the block away from the machine.

After that the operator on the other side of the frame inserts pallet 92 and pulls the control bar 70 and continues the operation from his side in a similar manner. The first operator removes the blocks to a truck so they can be carried to the steam room and although he can during this period pay no attention to the machine, the latter is working for him filling the compartment 15 that afterwards supplies the mold 17 on his side.

Some of the features of this invention, include its capacity to turn out blocks or articles of aggregate continuously, and do so quickly and well. It is practically foolproof. Its use of power is economical, and its construction compact. It avoids the use of pressure mechanism to mold the blocks. The sequence of operation does not depend on the judgment of the worker but on the automatic operation of its elements. The machine is symmetrically arranged so that the operators will be out of each other's way although handy to the parts over which they have control. While several workers actuate the machine, they do not interfere with each other, as they are safeguarded against the wrong manipulation of the main valve on which the operation of the machine depends. However each worker is kept busy attending to the work that he has to do in moving blocks etc., as needed, and this work is in such sequence as to require each man to do something not requiring the same operation of the machine. This lessens opportunities or inducements to make each operator try some operation of the machine that would interfere with another worker's operations. It will be noted that adjustments are provided on all parts that can use same appropriately.

The particular form of the invention just described pertains to the employment of a cored pallet. However it is appreciated that an uncored pallet may also be used in the same machine. To do this the mechanism for lifting and lowering the mold box, is modified in order that the coring of the building block to be made, may be performed from the upper end of the mold box instead of from the bottom of the box. In the previous case the cores project upwardly from the bottom of the box as can be seen in Fig. 2. In this modified form, there is no bottom plate to the mold box, so in order to have cores, the latter must be suspended from the top of the mold box, and a top plate is formed thereon for the purpose. The top plate of the mold box has holes or openings provided therein disposed on both sides of the cores, to allow the aggregate to be poured in. The box in this instance makes the building block upside down and is lifted off the latter after it is formed. The molded block of aggregate is left on a pallet supported on the rods 90, and in uncored, and holds its form sufficiently solid by its inherent adhesion to allow it to be moved from the machine. When the aggregate fills the mold box, the pressure plate 95 is dropped thereon in the previous manner described, and by reason of tampers mounted on its face, strikes the aggregate through the openings and compresses it. The frame 20 is extended at the sides to fit loosely around the rods 88 which are disconnected from the cross plate 89 so that the raising of the rods will bring collars mounted on them into contact with the frame to raise it also. This raises the mold box off the just-made building block, and enables the uncored pallet with the block on it to be moved off the machine. The rods 138 are eliminated in this modification because they are unnecessary.

While but one form of the invention is shown in the drawings and described in the specifications, it is not desired to limit this application for patent to this particular form or in any other way otherwise than limited by the scope thereof, as it is appreciated that other forms of construction could be made that would use the same principles and come within the scope of the appended claims.

I claim:

1. A molding machine for articles formed from aggregate comprising in combination, a framework, stationary platform horizontally positioned and secured to said framework including openings therein for the passage of said aggregate therethrough, a receptor slidable on said platform from one side to the other and having compartments therein open at the top and bottom for receiving the aggregate at the top and discharging it at the bottom through said openings when aligned therewith, means for sliding said receptor as aforesaid and aligning it at a predetermined location for the placement of the aggregate therein and after said placement moving it for discharge as aforesaid, a mold under said platform for the reception of the aggregate from the receptor to form said articles therein, platen means in the mold for said articles to form on, means for lifting said articles on its platen out of the mold after their formation therein to the level of said platform, means connected with said framework having a shelf thereon movable under said platen means and arranged to support same during a portion of said movement and to carry the articles from the machine for disposal, means for vibrating the mold as the aggregate is placed therein for settling and packing it therein, without employing mechanical pressure for compacting the aggregate in the mold, head plates supported in said frame, a mechanism on the receptor for tripping said head plate so it will fall on the aggregate at a predetermined instant, said head plate being attached to a toggle mechanism supported by said framework collapsible when raised and opening approximately straight when the headplate falls to its position of striking the mold as aforesaid whereby the rebound from said striking will be diminished by the straightness of the toggle mechanism at that instant.

2. A molding machine for articles formed from aggregate comprising in combination, a framework, stationary platform horizontally positioned and secured to said framework including openings therein for the passage of said aggregate therethrough, a receptor slidable on said platform from one side to the other and having compartments therein open at the top and bottom for receiving the aggregate at the top and discharging it at the bottom through said openings when aligned therewith, means for sliding said receptor as aforesaid and aligning it at a predetermined location for the placement of the aggregate therein and after said placement moving it for discharge as aforesaid, a mold under said platform for the reception of the aggregate from the receptor to form said articles therein, platen means in the mold for said articles to form on, means for lifting said articles on its platen out of the mold after their formation therein to the level of said platform, means connected with said framework having a shelf thereon movable under said platen means and arranged to support same during a portion of said movement and to carry the articles from the machine for disposal, means for vibrating the mold as the aggregate is placed therein for settling and packing it therein, without employing mechanical pressure for compacting the aggregate in the mold, head plates supported in said frame, a mechanism on the receptor for tripping said headplate so it will fall on the aggregate at a predetermined instant, said headplate being attached to a toggle mechanism supported by said framework collapsible when raised and opening approximately straight when the headplate falls to its position of striking the mold as aforesaid whereby the rebound from said striking will be diminished by the straightness of the toggle mechanism at that instant, and safety means connected on the hydraulic means and mounted on the framework for preventing the manipulation of the control thereof to change the sequence of operations of the machine.

3. A block forming machine comprising a framework, a main hopper having a discharge throat and mounted on said framework and containing aggregate, a platform secured to said framework beneath the main hopper, a feed transfer hopper slidable on said platform, said last named hopper having two compartments therein, means for automatically reciprocating the feed transfer hopper so that each compartment thereof aligns alternately with the discharge throat of the main hopper to receive aggregate therefrom, a pair of molds beneath the platform spaced on each side of the vertical axis of said framework such distance that one of said molds is always aligned with one compartment of the feed transfer hopper to receive the aggregate therefrom while the other compartment is aligned with the throat of the main hopper, an oscillator bar pivoted to the framework, a cam element at each end of said bar, said bar being oscillated by contact with the feed transfer hopper when the latter is at the end of each of its sliding movement, a vibrator connected with each mold and with said oscillator bar whereby each vibrator is sequentially operated when the feed transfer hopper reaches each end of its reciprocations, means for lifting the molded articles from each mold to the level of the platform and means for removing said articles from the machine.

4. A block forming machine comprising a framework, a main hopper having a discharge throat and mounted on said framework and containing aggregate, a platform secured to said framework beneath the main hopper, a feed transfer hopper slidable on said platform, said last named hopper having two compartments therein, means for automatically reciprocating the feed transfer hopper so that each compartment thereof aligns alternately with the discharge throat of the main hopper to receive aggregate therefrom, a pair of molds beneath the platform spaced on each side of the vertical axis of said framework such distance that one of said molds is always aligned with one compartment of the feed transfer hopper to receive the aggregate discharge therefrom while the other compartment is aligned with the throat of the main hopper, an agitating grid mounted in each compartment, means for actuating one of said grids when one of the compartments discharges into its associated mold, a vibrator for each of said molds, means for actuating the vibrator of one mold when the feed transfer hopper reaches the end of its reciprocations proximate to said mold, means for lifting the molded articles from each mold, sequentially, to the level of the platform and means for removing said articles from the machine.

5. A block forming machine comprising a framework, a main hopper having a discharge throat mounted on said framework and containing aggregate, a platform secured to said framework beneath the main hopper, a feed transfer hopper slidable on said platform, said last named hopper having two compartments therein, means for automatically reciprocating the feed transfer hopper so that each compartment thereof aligns alternately with the discharge throat of the main hopper to receive the aggregate therefrom, a pair of molds beneath the platform spaced on each side of the vertical axis of the framework such distance that one of said molds is always aligned with one compartment of the feed transfer hopper to receive the aggregate therefrom while the other compartment is aligned with the throat of the main hopper, means for agitating the aggregate fed to each mold, means for vibrating each mold controlled by movement of the feed transfer hopper, means for lifting the molded articles from each mold to the level of the platform, a loaded plate normally secured to said lifting means above the molds, tripping mechanism controlled by said lifting means for releasing said plate so that it falls on and packs the aggregate in each mold as it is raised, and means for removing the molded articles from the machine.

CHARLES KEPLER BROWN, Jr.

REFERENCES CITED

The following references are of record in the file of this patent:

UNITED STATES PATENTS

| Number | Name | Date |
|---|---|---|
| 866,999 | Avram | Sept. 24, 1907 |
| 2,193,879 | Muenzer | Mar. 19, 1940 |
| 2,270,829 | Wellnitz | Jan. 20, 1942 |
| 2,308,132 | Wellnitz | Jan. 12, 1943 |
| 2,360,122 | Gelbman | Oct. 10, 1944 |
| 2,398,146 | Kerfoot | Apr. 9, 1946 |
| 2,470,377 | Shepeck | May 17, 1949 |